United States Patent Office 3,382,880
Patented May 14, 1968

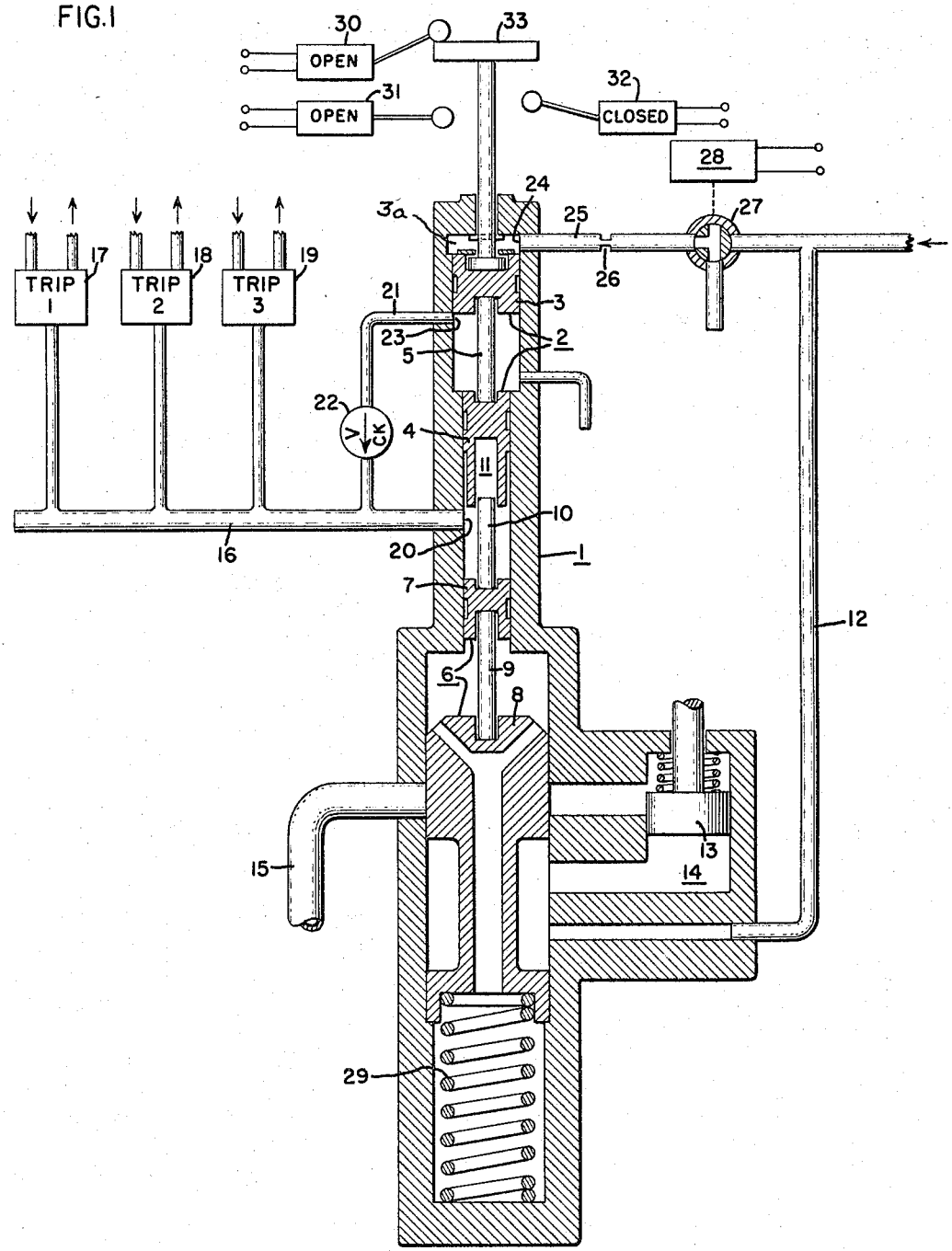

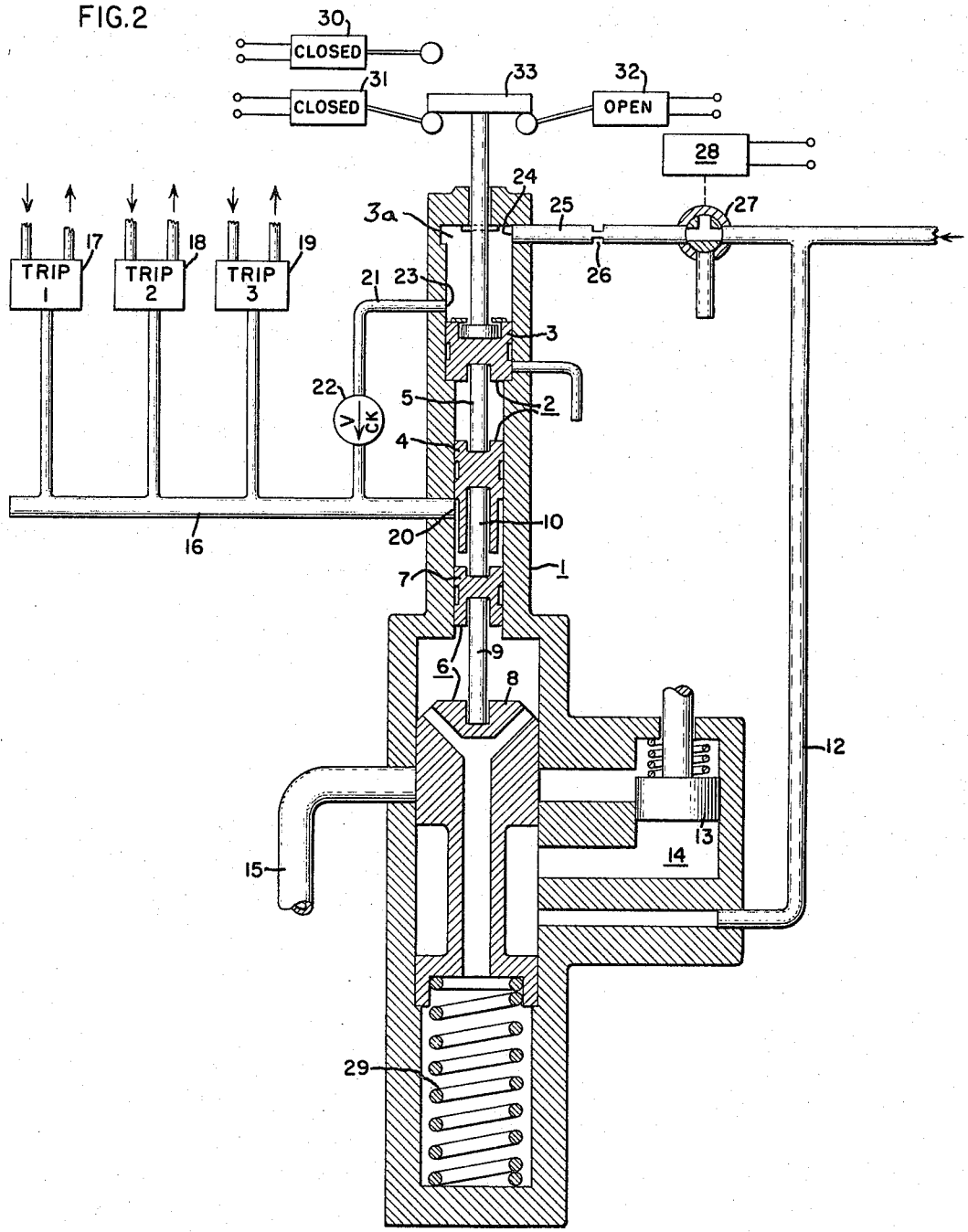

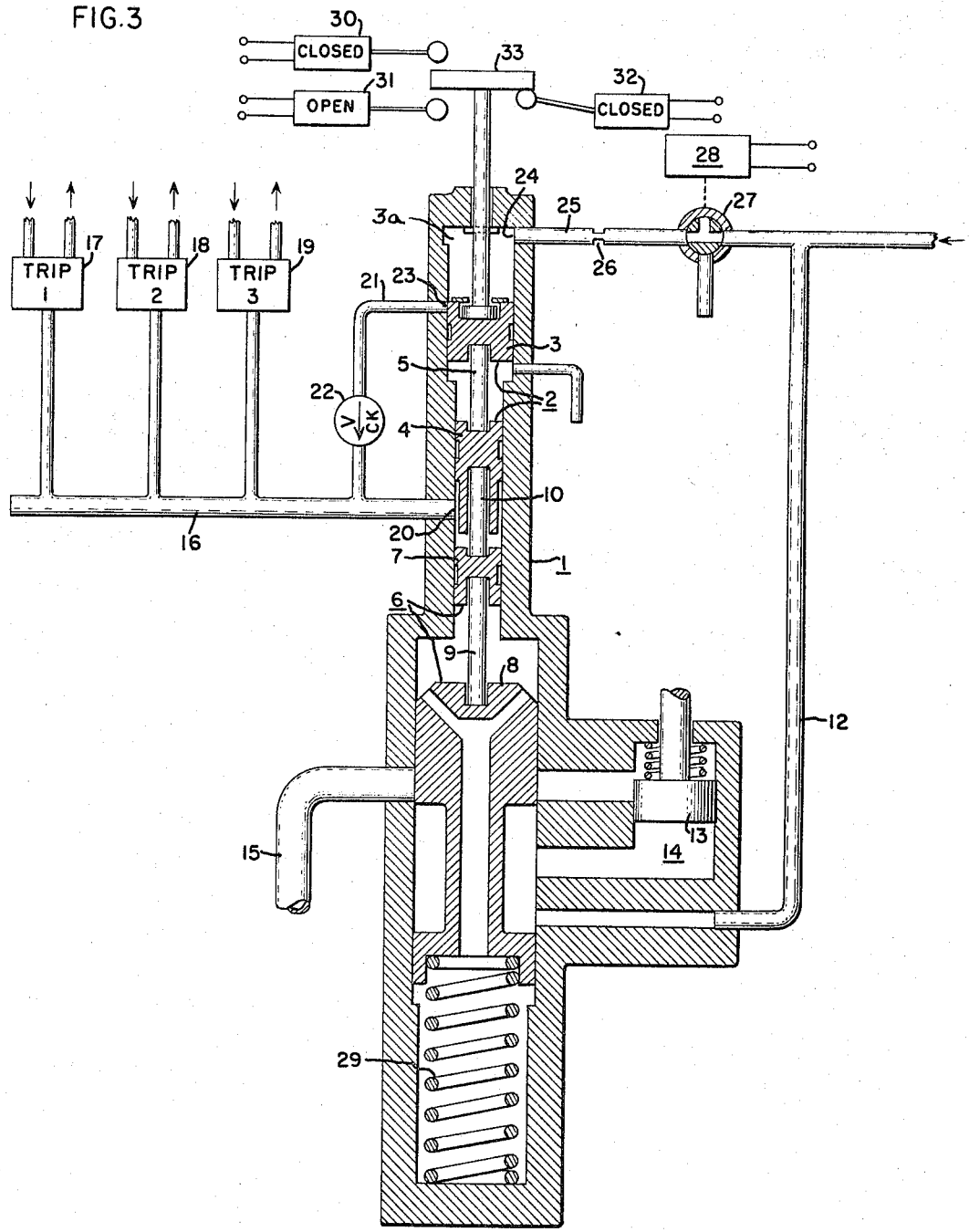

3,382,880
AUTOMATIC TRIP TEST SYSTEM
James B. Wagner, Lynnfield, Mass., assignor to General Electric Company, a corporation of New York
Filed Dec. 1, 1965, Ser. No. 510,781
6 Claims. (Cl. 137—24)

This invention relates to a fluid trip system wherein several tripping devices are arranged to evacuate a pressurized fluid line upon the occurrence of one or more selected conditions so to actuate a main shutdown device. More particularly, the invention relates to a fluid-actuated relay for sequentially testing the tripping devices in such a system without actuating the main shutdown device.

In a control system, it is often desired to have a number of safety tripping devices operating through a common fluid circuit to actuate a main shutdown device. An example of the foregoing is the hydraulic portion of a turbine control system, wherein a main steam shutoff valve is arranged to close when the hydraulic pressure is evacuated from a pressurized header. A number of dump-valves may be connected to the header and designed to evacuate fluid therefrom to shut down the turbine upon the occurrence of one or more operating conditions of the turbine such as a specified speed or temperature. Since the various tripping devices are only designed to operate in the event of abnormal conditions, it is necessary to "exercise" the tripping devices occasionally to be sure they are in proper operating condition without actually shutting down the turbine.

Various systems are known for isolating a pressurized trip header from a main shutdown device during testing of a tripping device. Some examples of these are shown in U.S. Patent 2,998,017—Cavalieri, issued Aug. 29, 1961 and in U.S. Patent 2,926,680—Eggenberger, issued Mar. 1, 1960, both assigned to the present assignee. The foregoing arrangements are well suited to the isolation of a single dump valve during testing, but are not suitable for individually and sequentially exercising a number of tripping devices automatically, and subsequently placing the trip system in its normal state ready to operate under true emergency conditions.

It is desired to have a testing system which will sequentially isolate and test any desired number of fluid tripping devices in rapid succession in a fully automatic manner.

Accordingly, one object of the present invention is to provide an automatic trip test system suitable for sequentially testing each of a number of tripping devices and returning each quickly to its normal state without actuating the main shutdown device.

Another object of the invention is to provide a hydraulic trip test system suitable for fully automatic operation.

The subject matter which is regarded as the invention is particularly pointed out and distinctly claimed in the concluding portion of this specification. The invention, however, both as to organization and method of practice, together with further objects and advantages thereof, may best be understood by reference to the following description taken in connection with the accompanying drawing in which:

FIG. 1 is a schematic sectional view showing the hydraulic trip test device in its "normal" position, FIG. 2 is a similar view showing the device in its "testing" position, and FIG. 3 is a similar view showing the device in its "resetting" position.

Briefly stated, the invention employs a relay valve casing in which two separate valve assemblies can assume four operable positions in the casing, i.e., "normal," "testing," "resetting," and "normal tripping." The assemblies move back and forth between "testing" and "resetting" positions as each trip device is tested and then return to the "normal" position.

Referring now to FIG. 1 of the drawing, a valve casing 1 has an upper valve assembly comprising a first valve member 3 and a second valve member 4 separated by a pin 5; and a second separate lower valve assembly 6 comprising a valve member 7 and a valve member 8 separated by a pin 9. An additional pin 10 is loosely disposed between valve assemblies 2, 6 with an axial spacing 11 so that the assemblies 2, 6 can move separately or as a unit in accordance with the mode of operation.

A conduit 12 connected to a source of fluid under pressure (not shown) holds piston 13 of a main shutdown device (not shown) in the raised position due to pressure in chamber 14 beneath piston 13. Chamber 14 is arranged to be evacuated through a discharge conduit 15 when valve member 8 is fully raised. However, it will be noted that valve member 8 can move upward a substantial distance before this action takes place.

A normally pressurized fluid header 16 is connected to a number of resettable tripping devices indicated as 17, 18, 19. Each of these tripping devices is constructed to be actuated by a selected condition so as to evacuate fluid from header 16. The tripping devices 17, 19 are also designed to be reset so that header 16 can again be pressurized, preferably from the same source as that supplying conduit 12. Such tripping devices are dump valves which can be mechanically or electrically actuated and are well known in the art. If mechanically actuated, they preferably have suitable electrically actuated resetting mechanism and also have limit switches indicating trip and reset positions so that the testing system can be made fully automatic as designed.

The header 16 is connected to the valve casing 1 at a port 20 between the upper and lower valve assemblies 2, 6 so as to normally hold the assemblies apart by fluid pressure as shown in FIG. 1. Header 16 is also connected to the upper part of valve casing 1 at a port 23 by means of a non-return conduit 21 having a check valve 22.

Connected to a chamber 3a through a port 24 in valve casing 1 above the valve member 3 is a restricted flow conduit 25 having an orifice 26 therein. Conduit 25 is arranged therein. Conduit 25 is arranged to be selectively connected to the previously mentioned pressure source by means of a three-way valve 27. Valve 27 is electrically actuated to initiate testing by means such as as solenoid device 28. The fluid introduced through conduit 25 provides a downward biasing force on piston assembly 2 when testing is initiated. This is because the area exposed to chamber 3a on top of valve member 3 is greater than the effective area on the bottom of valve member 4, the latter being subject to an equal pressure in the header 16.

As mentioned previously, the lower valve assembly 6 is also subject to pressure in header 16. In opposition to this pressure, a spring 29 provides an upward biasing force on valve member 8. Relative to the forces provided by the hydraulic fluid, spring 29 is relatively weak and only induces movement of the valve assemblies when all valve chambers are evacuated.

In order to externally determine the position of upper valve member 3 and to make the device fully automatic, limit switches 30, 31, 32 are provided. These are actuated by an abutment rod 33 connected to valve member 3. Limit switch 30 is closed when rod 33 commences downward movement. Switch 32 is opened when rod 33 reaches an intermediate position (see FIG. 3) and limit switch 31 is closed when rod 33 has moved downward to the point where valve member 3 is almost at the limit of its permissible downward travel.

Limit switches 30, 31, 32, solenoid 28, and the electrical actuating and resetting devices for trip members 17, 18, 19 are all interconnected in an electrical relay "logic circuit" (not shown), the design of which will be known to those skilled in the art. Briefly, the logic circuit is arranged to open valve 27 when testing is initiated and to sequentially trip and reset each of the devices 17, 18, 19 in turn, while valve assemblies 2, 6 move back and forth between a lower (testing) and an intermediate (resetting) position, as indicated by limit switches 31, 32. When testing is complete, solenoid valve 27 is deactivated and the assembly is returned to the position shown in FIG. 1.

The operation of the fluid trip test device will now be described. Referring to FIG. 1 of the drawing, the space above valve member 3 is unpressurized. Pressurized fluid port 20 from header 16 keeps valve assemblies 2, 6 separated. This is the "normal" position.

When testing is initiated, valve 27 is opened and fluid flows through the restricted flow conduit 25 to the upper side of valve member 3. Since the top area of valve member 3 is greater than the bottom area of valve member 4, valve assembly 2 moves downward against the separating pin 10. Upon completion of its travel, the device is in the "testing" position, indicated by limit switch 31.

Reference to FIG. 2 of the drawing shows the "testing" position. The first trip device 17 is artifically actuated or tripped. Actuation of the trip device evacuates header 16, and also the non-return line 21. The orifice 26 in the restricted flow conduit limits fluid flow into the space above valve member 3, so that now the chamber above valve 3 and the chamber below valve 4 are both evacuated. The biasing spring 29 causes the touching valve assemblies 2, 6 to move upward together toward an intermediate or "resetting" position (FIG. 3). This position is reached when valve member 3 blocks escape of fluid through port 23.

Reference to FIG. 3 of the drawing shows the "resetting" position. It will be noted that this position is indicated to the electric logic circuit by limit switch 32 and that the non-return conduit 21 is now substantially blocked off by valve member 3. Any slow flow of fluid into chamber 3a from orifice 26 merely moves valve 3 down slightly until it bleeds through one-way valve 22 into the header. It will also be particularly noted that the upward travel of the lower valve member 8 has not been sufficient to evacuate chamber 14 holding the main shutdown piston 13 in place. Thus the first trip device has been isolated and tested without actuating the main shutdown device.

Trip device 17 is now reset by the logic circuit and header 16 is re-pressurized. The restricted flow conduit 25 also continues to flow into chamber 3a about valve member 3. Since the header is at full pressure, no more flow takes place through conduit 21 and chamber 3a reaches full pressure. The connected valve assemblies 2, 6 move downward again to the "tripping" position as before, as shown in FIG. 2 and indicated again by limit switch 31.

The foregoing sequence is repeated with trip device 18 and trip device 19 for as many times as desired. When the logic circuit indicates that testing of all tripping devices have been completed, solenoid device 28 is deactivated to reposition three-way valve 27 and fluid from the upper chamber above valve member 3 is evacuated, allowing header pressure to push the two-valve assemblies 2, 6 apart so that they return to the position shown in FIG. 1 of the drawing.

It remains to note that the valve assemblies 2, 6 are able to assume a fourth position which is not indicated on the drawings. This is the "normal tripping" position wherein both valve assemblies 2, 6 are fully raised in casing 1. Such would be the case when testing was not taking place and if one of the trip devices 17–19 were to evacuate header 16 and conduit 21. In this event, since there would be no pressure above valve 3, biasing spring 29 would move the lower assembly 6 upward all the way to evacuate chamber 14 and actuate the main shutdown device.

Thus it will be seen that the fluid trip testing device disclosed provides in a single fluid actuated relay the ability to sequentially test a number of resettable tripping devices without actuating the main shutdown device. The same relay will actuate the main shutdown device upon actuation of any of the tripping devices when testing is not taking place. These functions are accomplished in a single universal device suitable for full automatic operation as controlled by an electric logic circuit.

Further objects and advantages will occur to those skilled in the art and it is intended to cover in the appended claims all such modifications as fall within the true spirit and scope of the invention.

What I claim is:

1. In a fluid control system having a plurality of resettable tripping devices maintaining fluid pressure in a header associated with a main shutdown device, a trip test relay comprising:

a valve casing having first and second separately movable valve assemblies disposed therein, the second valve assembly being arranged to actuate the main shutdown device in a normal tripping position, said casing having a first chamber between valve assemblies and connected to the header so as to urge the assemblies apart, and also having a second chamber on the opposite end of the first valve assembly from said first chamber, first means for moving the first valve assembly in contact with the second valve assembly in a testing position when testing is initiated, second means acting in opposition to the first means for causing the first and second valve assemblies to move toward an intermediate resetting position when one of said tripping devices is actuated to evacuate the header, said intermediate resetting position being short of the normal tripping position of the second valve assembly, third means associated with said first means returning the first and second valve assemblies to the testing position when pressure is re-established in the header by resetting the actuated tripping device, and, fourth means deactivating the first means when testing is completed.

2. The combination according to claim 1 wherein said first means comprises a pressure source connectable to said second chamber, and wherein the area of the first valve assembly exposed to the second chamber is larger than that exposed to said first chamber.

3. The combination according to claim 1 wherein said second means comprises spring biasing means urging the second valve assembly toward the first valve assembly and also including a second conduit connected between said second chamber and the header which is blocked when the first valve assembly reaches said intermediate resetting position.

4. The combination according to claim 1 wherein said third means comprises a restricted flow conduit furnishing pressurized fluid to said second chamber and also including a non-return conduit which allows flow to bleed from the second chamber into the header until header pressure is reestablished.

5. The combination according to claim 1 including external switching means arranged to be actuated in accordance with the positions of the valve assemblies at the resetting and at the testing positions respectively so that said valve assemblies can move back and forth between testing and resetting positions to automatically and sequentially isolate the tripping devices as they are tested by suitable external logic circuit means.

6. In an automatic trip test system having a plurality of resettable tripping devices maintaining fluid pressure in a header, the combination comprising:

a valve casing having first and second separately movable valve assemblies disposed therein and positionable to a "normal" position wherein the assemblies are spaced apart in opposite ends of the casing, a "testing" position wherein the assemblies are touching and in one end of the casing, a "resetting" position wherein the assemblies are touching and in an intermediate part of the casing, and a "normal trip" position wherein the assemblies are touching and in the other end of the casing, a first conduit connecting said header to the valve casing between valve assemblies in all of the aforesaid positions, a restricted flow conduit selectively connecting the pressure source to a first chamber in the valve casing when the assemblies are in all of the aforesaid positions and arranged to provide a biasing force for the first assembly towards the second assembly, a non-return conduit connected for flow from the first chamber toward the header when the assemblies are in the "testing" position and substantially blocked by the first assembly when the assemblies are in the "resetting" position, a main shutdown device actuated by the second assembly when the assemblies are in the "normal tripping" position, spring biasing means urging the second assembly toward the "normal tripping" position, means for causing one of the tripping devices to evacuate the header when the assemblies are in the "testing" position, means for resetting a tripping device to reestablish the pressure in the header when the assemblies are in the "resetting" position and, means for evacuating the restricted flow conduit to allow return of the assemblies to the "normal" position under the action of said biasing means when testing is complete.

References Cited
UNITED STATES PATENTS

| | | | |
|---|---|---|---|
| 2,926,680 | 3/1960 | Eggenberger | 137—24 |
| 2,998,017 | 8/1961 | Cavalieri | 137—24 |
| 3,342,194 | 9/1967 | Dwight | 137—24 |

CLARENCE R. GORDON, *Primary Examiner.*